Figure 1:
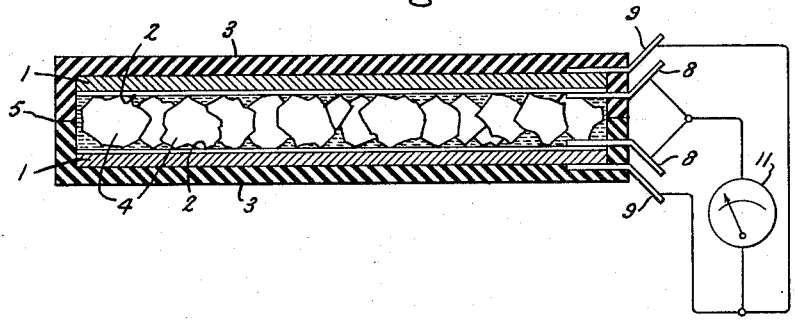

Oct. 23, 1956

W. W. SCHULTZ 2,768,308

RADIATION DETECTOR

Filed Nov. 2, 1951

Inventor:
Warner W. Schultz,
by Paul A. Frank
His Attorney.

_United States Patent Office_

2,768,308
Patented Oct. 23, 1956

2,768,308

RADIATION DETECTOR

Warner W. Schultz, Schenectady, N. Y., assignor to General Electric Company, a corporation of New York Application November 2, 1951, Serial No. 254,503

4 Claims. (Cl. 250—71)

My invention relates to an instrument for detecting and measuring penetrating radiation and more particularly to a portable device for detecting such radiation, for example, alpha, beta, gamma, and neutron radiation, and X-rays. Many instruments available today for the purpose of detecting and measuring such penetrating radiation require an outside power source, such as a battery, in order to operate properly. One object of my invention is to provide a radiation detector which is self-generating and which does not require any outside power source for its proper functioning.

Another object of my invention is to provide radiation measuring equipment which is simple in construction, compact, and light in weight, and therefore easily portable. At the same time, such equipment, according to my invention, will be extremely rugged and durable, will last indefinitely and will not require an experienced operator to use it.

Radiation detecting and measuring equipment, according to my invention, may have its radiation-sensitive element located in a spot quite remote from the location of its indicating element, making the equipment especially useful where high intensities of radiation must be surveyed. Alernatively, the sensitive element and the indicating element, because of their small size and weight, may both be located in the same housing or casing, to provide a single instrument which may be readily carried and used by a surveyor traveling on foot or in a vehicle of any sort, providing the intensity of radiation is not great enough to be physiologically harmful to the user.

The principal objects of my invention are met by providing as the radiation sensitive element a body of phosphor which will fluoresce and emit light when penetrating radiation strikes it, a photovoltaic cell sensitive to light of the wavelengths emitted by the phosphor, the sensitive surface of the cell being located next to the phosphor, and an optical transmitting medium and arrangement for insuring that light from the phosphor, and only light from the phosphor, will be transmitted to the cell for maximum response. The photovoltaic cell will respond to light from the phosphor and convert the light energy into electrical energy which can be measured directly by an indicating element electrically connected to the photovoltaic cell in the radiation-sensitive element and located at a position either remote from or near the sensitive element.

Other objects and further details of that which I believe to be novel and my invention will be clear from the following description and claims taken with the accompanying drawing in which are illustrated examples of instruments for detecting and measuring penetrating radiation embodying the present invention and incorporating my improved structures.

Figure 2:
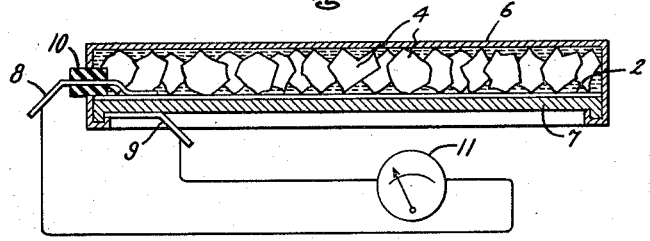
Figure 3:
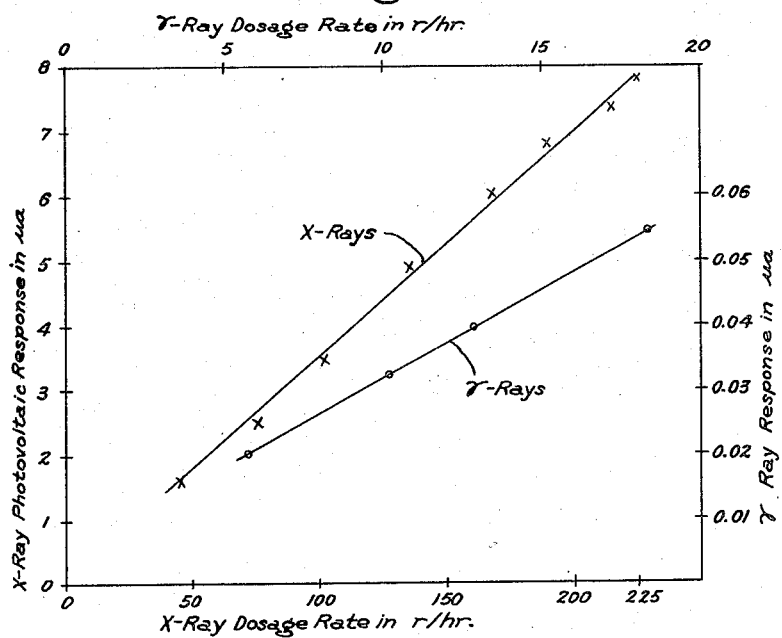

In the drawing, Fig. 1 is a sectional view through a radiation-sensitive element according to one form of my invention, with the electrical connections thereto and to an indicating element shown diagrammatically; Fig. 2 is a similar sectional view and wiring diagram showing another form of my invention; and Fig. 3 is a chart showing a typical response of a radiation-sensitive element according to my invention, to X-rays and to gamma rays.

The basic element of the radiation-sensitive portion of my invention is a photovoltaic cell. Such cells are well known by themselves and are not part of my invention, but one form of a photovoltaic plate will be described in sufficient detail here to serve as a background for proper understanding of the rest of my invention. The photovoltaic cell includes a metal plate 1, usually of steel, although other metals may be used. Various shapes and sizes of plates are known. Illustrated here is a flat disk, about four inches in diameter. On one surface of the plate a sensitized surface 2 is provided. This surface is made of a layer of selenium and several extremely thin translucent layers of conducting metals. This forms the light-sensitive surface and when light strikes the sensitive surface a voltage is generated between the front sensitive surface and the backing plate surface of the cell. If the leads of a microammeter or similar instrument are properly connected with the front and back surfaces of the photovoltaic plate, a current, which varies with the intensity of light reaching the sensitive surface, will flow through the instrument. By proper calibration and scale marking of the instrument, the intensity of the radiation on the cell can be read on the instrument. Excepting for electrical contacts for terminal connections, the entire plate may be covered by a transparent coating of plastic to protect the surfaces against atmospheric influence and mechanical injury. Such a photovoltaic cell or plate requires no external source of voltage but generates its own electrical output, depending upon the energy from the light falling upon the cell.

In one preferred form of my invention shown in Fig. 1, two photovoltaic plates are used, placed with their light-sensitive surfaces facing each other within a casing or enclosing shell 3 made of electrical insulating material. The material of the casing is opaque to light and will therefore prevent the introduction of light which might activate the photosensitive surfaces of the photovoltaic cells directly. The casing obviously prevents entry of foreign substances into the shell which might affect the operating of the device. Furthermore, the casing holds the various internal parts in proper relative position and furnishes support for the electrical terminals of the photovoltaic plates so that they may be connected to indicating elements as hereinafter described.

Within the casing and between the two photovoltaic plates the primary radiation-sensitive structure is located. This consists of chunks of a phosphor 4. The particular phosphor used will be one which best responds to the type of penetrating radiation which is to be detected or measured. Radiation impinging on the phosphor will cause it to emit light. Light emitted will be proportional to the radiation received by the phosphor and therefore the material of the casing must be selected so as to be transparent to the radiation, although it is opaque to light. Many materials of the character known broadly as "plastics" are suitable for the casing, as are several metals.

As examples of phosphors which have been found suitable for the detection of X-rays and gamma rays, I mention thallium activated sodium iodide crystals or thallium activated potassium iodide crystals. These give a large response for a given radiation intensity of either X-rays or gamma rays.

The phosphor crystals may be prepared in any suitable fashion. For example, a mixture of the iodide with one quarter of one per cent of thallous chloride may be made, melted, and crystallized. Or the thallous chloride may be added to previously molten iodide, mixed and then cooled to crystallizing temperature.

A photovoltaic plate or cell which has high sensitivity in the ultraviolet region works best with the phosphor described here because of the light emitting characteristics of these phosphors when stimulated by radiation which is to be measured.

I have further found that irregular chunks of the phosphor give a higher light output for a given radiation intensity than does a solid piece of the same weight. These chunks should be roughly the size of a pea or slightly larger for best results.

In order further to obtain the best results and to transmit the maximum of light from the activated phosphor to the photovoltaic plates, I provide an optical transmitting medium in the form of an oil which fills all of the space within the casing or shell not occupied by the photovoltaic plates and the chunks of phosphor. This oil should be transparent to light emitted by the phosphor and should be of a nature to avoid chemical reaction with either the phosphor or the materials of the photovoltaic plate and the enclosing case. I have found that a clear paraffin base petroleum oil is excellent for this purpose. The oil serves several purposes: first, because the phosphor is likely to be hygroscopic, the oil prevents contact of the phosphor with air or moisture; second, the oil gives better light transmission from the individual crystals to the plate or plates; third, the oil tends to reduce surface reflection of light from the plate or plates.

The casing shown in Fig. 1 is sealed as at the joint 5 to prevent loss of the oil from the radiation sensitive element. Electrical terminals 8 and 9 are extended through the casing wall from the photovoltaic plate or plates for connection to suitable indicating instruments or automatic response mechanisms of various sorts. These connections may be made in the same fashion that photovoltaic cells have heretofore been connected. In this way a simple reading of values may be obtained, or a permanent record may be inscribed, or alarms can be sounded or other apparatus or machinery may be actuated by suitable amplification or modification of the current response from the photovoltaic plate. As an example of an indicating element which has been found suitable for use with the radiation sensitive element according to my invention, I mention the common microammeter or the galvanometer indicated diagrammatically in the drawings by the number 11.

Radiation detecting equipment, according to this invention, may be used in several ways. For example, we will assume that a survey of relatively low intensity radiation is to be made. The radiation sensitive element is exposed in the area to be surveyed and the penetrating radiations pass through the casing 3 and through the photovoltaic plate or plates 1 and to strike the phosphor crystals, activating them to emit light. Light emitted from the phosphor chunks strikes the sensitive surface 2 on the photovoltaic plate and the oil assists in proper light transmission. As explained above, a voltage will then be generated between the front and back surfaces of the plate and connection of the terminals 8 and 9 to the indicating element 11 will cause a measurable current to flow through the indicating instrument. For low intensity measurement, the indicating instrument and the sensitive cell may both be mounted in a single small box and be carried around together.

For measuring high intensity radiation, the radiation sensitive element may be placed in the area to be surveyed and electrical leads from the terminals extended to a remotely safe location where they may be connected to the indicating element or mechanism. On tests for such remote indication, both X-rays and radium gamma rays have produced readings on the indicating equipment which are equal to each other, whether the indicating element is located close to the radiation responsive element or is far away from it. One such test included a spacing of about 2000 feet between the sensitive element and the indicating element with no observable difference in response from that obtained with spacings of a few inches between elements.

Fig. 3 is a chart or graph showing the response of the radiation sensitive element to X-rays and gamma rays. The left-hand vertical and lower horizontal coordinates of the chart are used for plotting the curve for X-ray response. The right-hand vertical and upper horizontal coordinates are used for plotting the curve of the gamma ray response. In both cases the ray dosage is given in roentgens per hour, and the response is given in microamperes as measured from the photovoltaic cell. It will be seen that a linear response is obtained from the cell with respect to dose rate in at least the range of radiation intensities investigated. It should also be noted that the instrument will cover a wide range of radiation intensity. In the lower ranges a galvanometer was used to measure the output current of the cell. In the higher range a microammeter was used to measure the current output.

Improved sensitivity of an instrument according to my invention may be obtained by the arrangement shown in Fig. 2. In this case, the photovoltaic plate 7 is made of aluminum rather than steel, and may be provided with a flange around its edge as shown. The light sensitive surface 2 remains as before. The casing 6 in this form of the invention may be made of a suitable metal, such as aluminum, and its edges may be rolled or spun over the edges of the flange on the plate 7 to complete the sealed enclosing structure. In this form, it will be noted that the plate forms one wall of the casing or enclosure. As in the previous form, the chunks of phosphor 4 are enclosed within the casing together with the transparent oil. However, in this form but a single plate is used instead of the two plates of Fig. 1. The terminals 8 and 9 are connected as before to the sensitized surface and to the backing surface of the photovoltaic plate, and suitable electrical connections are made to an indicating instrument 11. In order to insulate the terminal 8 from the casing 6, an insulating and sealing bushing 10 may be provided.

The tests described above related to measuring X-rays and gamma rays. It has also been found that the radiation sensitive element responds to beta radiation, provided the filtration is such that the beta rays are allowed to expend some of their energy in the phosphor. The instrument of this invention has uses as equipment for detecting and measuring radiation following an atomic explosion, as a beam meter for all types of particle accelerators, as an exposure timing or intensity measurement device in connection with X-ray equipment, in the remote indication of radiation intensity, for example, as a long probe type survey meter, and for measurement of a neutron flux when used with a suitable phosphor. With a remotely located indicating element, reactor instrumentation may be obtained external to a reactor.

As will be evident from the foregoing description, certain aspects of my invention are not limited to the particular details of construction of the examples illustrated, and I contemplate that various and other modifications and applications of the invention will occur to those skilled in the art. It is therefore my intention that the appended claims shall cover such modifications and applications as do not depart from the true spirit and scope of my invention.

What I claim as new and desire to secure by Letters Patent of the United States is:

1. A detector for measuring a given penetrating radiation comprising, a sealed outer casing impervious to visible light but transparent to said given radiation, a photovoltaic plate having a light sensitive surface thereon positioned entirely within the casing, a multiplicity of crystalline phosphor pieces which emit light scintillations when subjected to said given radiation, said pieces forming a layer entirely within said casing adjacent to said light sensitive surface, a light transmitting paraffin base petroleum oil in said casing occupying the spaces between said pieces and said light sensitive surface whereby a maximum of light is transmitted to said light sensitive surface to increase the sensitivity of the detector, electrical terminals on said photovoltaic plate for connection of an indicating instrument thereto, said terminals extending outside of said casing in insulated relation with respect to each other.

2. A detector for measuring a given penetrating radiation comprising, a sealed outer casing impervious to visible light but transparent to the given radiation, a photovoltaic plate having a light sensitive surface thereon positioned entirely within said casing, a multiplicity of crystalline phosphor pieces which emit light scintillations when subjected to the given radiation, said pieces forming a layer entirely within said casing adjacent to said light sensitive surface, a light transmitting paraffin base petroleum oil in said casing occupying the spaces between said pieces in said light sensitive surface whereby a maximum of light is transmitted to said light sensitive surface to increase the sensitivity of the detector, a second photovoltaic plate having a light sensitive surface thereon positioned entirely within said casing with its sensitive surface on the other side of said crystalline phosphor layer, and electrical terminals on said photovoltaic plates for connection of an indicating instrument thereto, said terminals extending outside of said casing.

3. A detector for measuring a given penetrating radiation such as X-rays and the like comprising, a sealed outer casing of a material impervious to visible light but transparent to the given radiation, a photovoltaic plate having a light sensitive surface thereon positioned entirely within said casing, a multiplicity of crystals of thallium activated sodium iodide forming a layer within said casing adjacent to said light sensitive surface, a light transmitting clear paraffin base petroleum oil in said casing occupying the spaces between said crystals and between said crystals and said light sensitive surface whereby a maximum of light is transmitted to said light sensitive surface to increase the sensitivity of the detector, and electrical terminals on said photovoltaic plate for connection of an indicating instrument thereto.

4. A detector for measuring a given penetrating radiation such as X-rays and the like comprising, a sealed outer casing of a material impervious to visible light but transparent to the given radiation, a photovoltaic plate having a light sensitive surface thereon positioned entirely within said casing, a multiplicity of crystals of thallium activated potassium iodide forming a layer within said casing adjacent to said light sensitive surface, a light transmitting clear paraffin base petroleum oil in said casing occupying the spaces between said crystals and between said crystals and said light sensitive surface whereby a maximum of light is transmitted to said light sensitive surface to increase the sensitivity of the detector, and electrical terminals on said photovoltaic plate for connection of an indicating instrument thereto.

References Cited in the file of this patent

UNITED STATES PATENTS

| | | |
|---|---|---|
| 2,128,110 | Wilson | Aug. 23, 1938 |
| 2,190,200 | Victoreen | Feb. 13, 1940 |

OTHER REFERENCES

The New Phenomenon of Electrophotoluminescence, by G. Destriau, Philosophic Magazine, October 1947, page 713.

Nucleonics, March 1948, pp. 58, 59.

Physical Review, March 1, 1949, vol. 75, #5, pp. 796–810.